United States Patent [19]
Boghosian

[11] 3,730,182
[45] May 1, 1973

[54] METHOD OF DELIVERY OF SOLUTION TO SKIN HAVING SUBSTANTIAL AMOUNTS OF HAIR THEREON

[75] Inventor: Malcolm P. Boghosian, Long Beach, Calif.

[73] Assignee: Allergan Pharmaceuticals, Santa Ana, Calif.

[22] Filed: Mar. 19, 1971

[21] Appl. No.: 126,340

Related U.S. Application Data

[63] Continuation-in-part of Ser. No. 781,781, Dec. 6, 1968, abandoned.

[52] U.S. Cl. .........................128/173, 132/7, 424/45
[51] Int. Cl. ..............................................A61m 11/00
[58] Field of Search......................128/173, 225, 261, 128/172, 272; 132/7, 9, 114, 115; 424/45, 47

[56] References Cited

UNITED STATES PATENTS

| | | | |
|---|---|---|---|
| 1,150,238 | 8/1915 | Winbray | 132/114 X |
| 3,477,447 | 11/1969 | Eldredge | 132/9 |
| 2,998,822 | 9/1961 | Birch et al. | 132/116 |
| 910,884 | 1/1909 | Van Eps | 128/232 |
| 1,089,595 | 3/1914 | Sopha | 128/232 |

Primary Examiner—Richard A. Gaudet
Assistant Examiner—G. F. Dunne
Attorney—Fulwider, Patton, Rieber, Lee & Utecht

[57] ABSTRACT

A method for delivery of medicaments to human or animal skin having substantial amounts of hair growing therefrom, for example, the scalp, comprising the steps of transporting the medicaments in a volatile carrier solution to a position closely adjacent to the skin without wetting the hair with the preparation, and atomizing the preparation at said position onto the skin to thereby uniformly distribute the preparation over the scalp thereby improving absorption of the medicament through the skin without significant interference by the hair.

10 Claims, 2 Drawing Figures

Patented May 1, 1973 3,730,182

FROM BOTTLE

INVENTOR.
MALCOLM P. BOGHOSIAN
BY Fulwider, Patton, Rieber
Lee, and Utecht
ATTORNEYS

1

METHOD OF DELIVERY OF SOLUTION TO SKIN HAVING SUBSTANTIAL AMOUNTS OF HAIR THEREON

This application is a Continuation In Part of U.S. Ser. No. 781,781 filed Dec. 6, 1968, now abandoned.

BACKGROUND OF THE INVENTION

This invention relates to methods for delivering solution to skin covered by substantial amounts of hair, and, more specifically, to methods for treating human or animal skin conditions and disorders such as, for example, seborrheic dermatitis of the scalp and associated scalp disorders in humans, by delivering medicinal solutions to the affected skin area in a novel manner.

Heretofore, various medicinal formulations have been made available for treating seborrheic dermatitis, generally termed herein as "dandruff." The formulations have comprised both "anti-dandruff" shampoos and alcohol-based, glycol-based or similarly based solutions or ointments generally containing anti-inflammatory agents alone (steroids such as hydrocortisone or prednisolone) or anti-microbial agents such as hexachlorophene or benzalkonium chloride, or a combination of both anti-inflammatory agents and anti-microbial agents. Although these medicinal formulations have proved successful in treating various types of dandruff conditions, they have had the disadvantage of being inconvenient and/or difficult to apply.

The usual mode of application of "anti-dandruff" preparations is by shampooing one's hair. This mode of application is unsatisfactory because while major amounts of the active components of the shampoos initially contact both the hair and scalp, rinsing out of the shampoo eliminates substantial amounts of the active components of the shampoo and thereby prevents the shampoos from having significant or lasting medicinal effect.

Because of the substantial loss of active agents from the scalp during rinsing, it is economically impractical to provide shampoos with expensive components such as the anti-inflammatory steroids, for example, hydrocortisone. The effect of this exclusion of expensive components is that the shampoos are significantly less effective than they would otherwise be if they contained these expensive components. Furthermore, because of the total wetting of the hair by the shampoos, shampoos cannot be used as often as required, for example, two or three times a week for severe dandruff conditions, by women who regularly have their hair styled.

The aforementioned alcohol- and glycol-based solutions are usually applied to the scalp using an eyedropper or by simply pouring the solution onto the scalp. These application methods localize, that is, non-uniformly distribute, the solution on the scalp so that there is a relatively high concentration of the solution and active components at the center of the applied solution with decreasing concentrations and effectiveness to the edge of the applied solution.

The solutions may also be applied using aerosol containers having a normal spray head. However, this method results in substantial coating of the hair by the solution so that only a small percentage of the solution finds its way to the scalp for treatment of the affected area. Substantial matting of the hair is also caused by this method due to the large amounts of solution deposited on the hair. This method is very restricted in its use since it cannot be used on skin areas where the hair is relatively thick, such as exists on most women's scalps.

The aforementioned ointments have somewhat the same disadvantages as those associated with use of the above-mentioned solutions. To apply the ointments, the hair must be parted to expose the affected area and, thereafter, the ointment is rubbed over the affected area. Besides the resulting localization of the ointment, substantial amounts of the ointment are coated onto the hair making the use of ointments inefficient and very messy.

The patent to Winbray, U. S. Pat. No. 1,150,238, describes a device somewhat similar in principle to that shown in the present invention. However, Winbray atomizes by passing air under pressure through a medicated liquid. The present invention utilizes an inert propellant such as fluorocarbon gas in combination with a volatile alcohol such as isopropyl alcohol or ethanol to promote instant evaporation of the inert carrier at the skin, thus distributing the medicaments onto the scalp in the form of micro-crystals which promote rapid absorption and subsequent healing, as discussed more fully below.

SUMMARY OF THE INVENTION

The method of this invention comprises atomizing or spraying a medicinal preparation onto the affected skin having substantial amounts of hair growing thereon without significantly wetting the hair with the preparation. This is accomplished by atomizing a medicinal solution, at a controlled rate, onto the affected skin areas from a position closely adjacent to the skin. More specifically, a medicinal solution is transported in a substantially closed system or confined zone past substantially all of the hair growing outwardly from the skin to a position closely adjacent to the skin where it is atomized and directed, in atomized form onto the skin.

At present the medicinal solution is preferably transported to a position closely adjacent to the skin and directed onto the affected areas of skin in atomized form by an atomizer containing both the medicinal solution and a gaseous propellant. The atomizer is fitted with a small-diameter, elongated nozzle having a bore extending therethrough. Because of the narrowness and elongation of the nozzle, its working end can be placed close to the skin, which is to be treated, so that atomization of the solution takes place substantially at the skin surface.

The advantages of treating skin conditions, and particularly dandruff, in this manner include the ability to uniformly direct substantially the desired amount of medicinal solution onto the affected skin areas. Furthermore, this can be accomplished without significantly coating the hair with the medicinal solution. Additionally, only affected skin areas are treated; adjacent skin areas need not be contacted by the atomized medicinal solution. The method of this invention can be successfully employed to deposit preparations onto skin regardless of the thickness of the hair growing from the skin.

In addition, it is believed that penetration of the active ingredients in the medicinal composition into the skin or scalp is greatly enhanced by transporting the medicinal composition to a position closely adjacent the scalp in a carrier comprising non-volatile means for solubilizing the medicament, e.g. 0.5–5 percent isopropyl myristate and about equal amounts of a volatile organic compound such as ethanol or isopropyl alcohol and a conventional propellant such as fluorocarbon, e.g. dichlorotetrafluoroethane. Upon atomization, the volatile portions of the carrier evaporate leaving behind a supersaturated solution of medicament in the non-volatile solubilizing means. The supersaturated solution of medicament acts as a driving force to promote rapid diffusion of the medicament to the skin. This result is due to the well-known principle of diffusion of substances from points of high concentration to points of low concentration. When the volatile portions of the carrier evaporate, the medicament remains in the non-volatile solubilizing means in the form of microcrystals which must redissolve to be available for diffusion and absorption by the skin and thus have a longer healing effect.

DESCRIPTION OF THE PREFERRED EMBODIMENT

The method of this invention comprises spraying or atomizing a medicinal or chemical solution or preparation directly onto affected skin areas having large amounts of hair growing therefrom without significantly coating the hair. This is accomplished by directing the medicinal or chemical solution, at a controlled rate, onto the skin in atomized form from a point closely adjacent the skin. More specifically, the medicinal or chemical solution is atomized by and exhausted from an atomizer having a thin, elongated nozzle, the exhaust end of which is placed closely adjacent the skin when it is desired to uniformly cover the affected skin areas. In this manner, the solution is transported past substantially all of the hair before being sprayed onto the underlying skin.

The method of this invention may be employed to treat hairy skin areas of both man and lower animals. Also, the medicinal or chemical solution may be any solution lending itself to atomization or vaporization. Therefore, various skin disorders can be treated by this method. However, because of the prevalence of the skin ailment commonly known as "dandruff," this method will hereafter be described with reference to the treatment of dandruff and, more particularly, to the treatment of human scalp dandruff.

Figure 1:
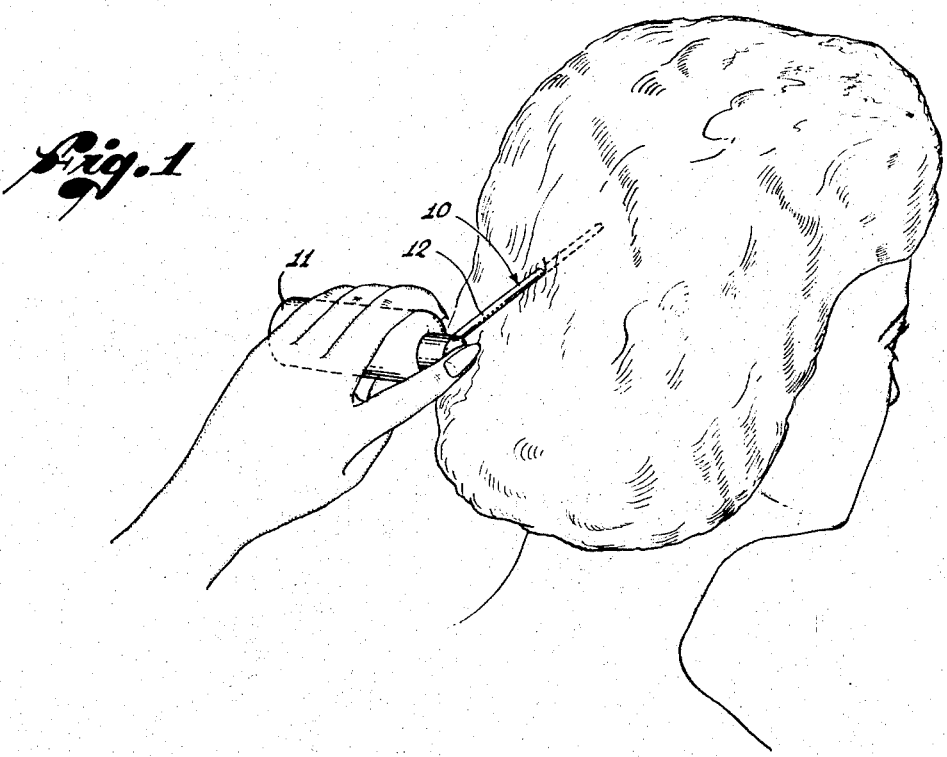
FIG. 1 is a perspective view of an atomizer shown in operating position with respect to a person's scalp for carrying out the method of this invention.
Figure 2:
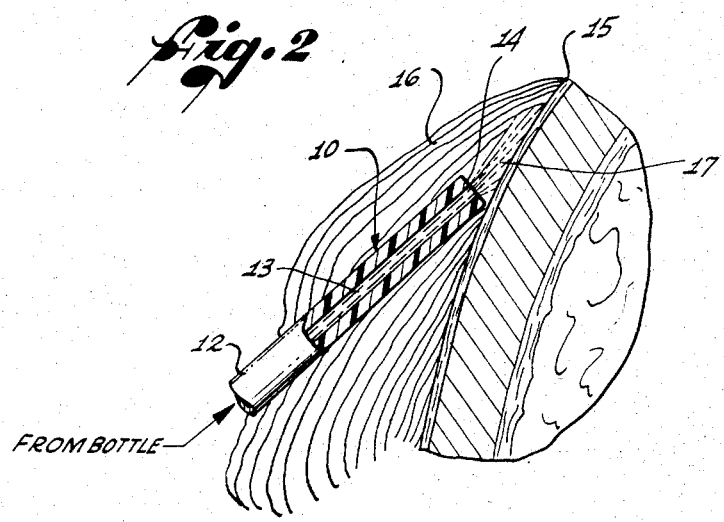
FIG. 2 is a close-up of the nozzle of the atomizer of FIG. 1 with its exit end in operating position closely adjacent a person's scalp.

The term "closely adjacent" as used herein and in the claims includes touching of the skin with the end of the nozzle when angled thereto as shown in FIG. 2.

In general, then, this invention comprises atomizing an anti-dandruff solution at a point closely adjacent the affected areas of the scalp. That is, the anti-dandruff solution is transported to a point closely adjacent the affected skin area within an enclosure before being released into the air in atomized form. The rate of atomization is controlled so that substantially only the desired amount of anti-dandruff solution is directed onto the affected areas per unit of time.

More specifically, an anti-dandruff solution is combined, under pressure, with a gaseous propellant in a container or atomizer having an elongated nozzle or delivery tube. The exhaust end of the elongated nozzle is placed substantially in contact with the affected scalp area and the anti-dandruff solution is directed onto the affected areas while moving the exhaust end of the nozzle across the affected areas.

Referring now to the figures, the numeral 10 designates a presently-preferred delivery system or atomizer comprising a reservoir 11 and an elongated nozzle 12 having a bore 13 extending therethrough and communicating at one end, with the exterior of the reservoir and, at the other end, with the external environment. The exhaust end 14 of the nozzle 12 is placed in use by the operator so that the nozzle 12 is at a small acute angle relative to the surface of the scalp 15 somewhat as shown in FIG. 2 of the drawings. To ensure that the anti-dandruff solution is directed substantially only onto the scalp 15, the nozzle 12 has a relatively narrow outer diameter so that it can effectively penetrate between the hairs 16 growing from the scalp 15 as shown in FIG. 2. The dimensions of a nozzle which has given satisfactory service are as follows: length of nozzle 5.0 in.; diameter of nozzle bore 0.030 in.; and outer diameter of nozzle 0.125 in.

It has been found that, when employing the heretofore-described atomizer 10 for treatment of human skin disorders, the rate of delivery of atomized solution to the scalp 15 should be preferably between about 0.15 gm/sec. and about 0.8 gm/sec. Above about 0.8 gm/sec., the rate of delivery of solution may be too rapid to provide substantially even coverage of the affected areas and may deliver an excess of solution onto the affected area. Below about 0.15 gm/sec., the rate of delivery is too low to provide effective atomization of the anti-dandruff solution. That is, below this minimum flow rate, the solution tends to be exhausted from the atomizer in drop or bulk form thereby "flooding" the treated skin area. Preferably, the flow rate of anti-dandruff solution lies between about 0.19 gm/sec. and about 0.4 gm/sec.

Nozzle bores of between 0.01 inches and about 0.06 inches also may be used depending upon the particular circumstances. The propellant pressure may be varied over a considerable range, depending upon the type of propellant used. The net result is that the rate of delivery of atomized solution, to effect a satisfactory spray pattern, can vary between about 0.01 gm/sec. and about 3.2 gm/sec.

The solution employed in the atomizer 10 is any effective anti-dandruff solution which can be atomized using the delivery system of the invention. An effective anti-dandruff solution for use in the previously-described atomizer 10 has the following composition:

| Component | % By Weight |
| --- | --- |
| Hydrocortisone | 0.5 |
| Hexachlorophene | 0.5 |
| Isopropyl myristate | 5.0 |
| Ethanol | to make 100% |

The anti-dandruff solution may be atomized using an inert, non-toxic gas such as the fluorocarbons, for example, dichlorotetrafluoroethane (Freon 114). It has been found advantageous to employ approximately equal amounts by weight of anti-dandruff solution and gaseous propellant. For example, 30 grams of the above anti-dandruff composition when combined with 30 grams of propellant (Freon 114) produces good results.

In operation, the atomizer 10 is positioned near the scalp 15 so that the exit end of the nozzle 12 is almost touching the scalp, and so that the nozzle makes an acute angle with the scalp as shown in FIG. 2. Preferably, with the nozzle 12 angled as described, the nozzle is initially placed near the back of the scalp 15. The reservoir 11 is then activated, thereby forcing atomized, anti-dandruff solution 17 from the nozzle 12 and onto the scalp 15. The nozzle 12 is then moved at a substantially uniform rate from its initial rear position to a position at the front of the scalp 15 along a line therebetween. While being so moved, the angle of the nozzle 12 relative to the scalp 15 is maintained substantially as above described. Maintaining the nozzle 12 in this position relative to the scalp 15 ensures uniform deposition of the solution and its active components on the scalp adjacent the nozzle's line of travel. When the nozzle 12 has reached the front of the scalp 15, the flow of solution from the atomizer 10 is discontinued.

To coat other areas of the scalp 15, the above procedure is preferably repeated. The atomizer 10 is moved over the scalp 15 in this manner until all of the affected areas of the scalp are covered with a substantially uniform coating of anti-dandruff solution. As the atomizer 10 is moved over the scalp 15, the exit end 14 of the nozzle 12 moves correspondingly along a plane adjacent the scalp so that substantially little of the hair 16 is wetted by the solution.

The particular atomizer employed need not be of the push-button type, but may be, for example, of the squeezable type. However, it should be capable of delivering solution in atomized form at controllable rates such as those previously set forth. Additionally, it should include an elongated nozzle as described.

Solutions employed for treatment of animal skin problems include anti-flea solutions containing pyrethrins and other chemicals in solution. Such solutions are atomized by the delivery system of this invention in the same manner as has just been described with respect to the treatment of human skin disorders.

This invention has been described with respect to the application to skin of a preparation for treating of certain skin conditions and ailments. However, included within the compass of this invention is the application of other preparations to the skin of animals, such as the anti-flea preparations.

I claim:

1. A method of delivery of medicaments to human or animal skin areas having substantial growth of hair thereon which comprises:
   providing a pressurized aerosol spray container having actuating means and containing a composition comprising an effective amount of a medicament selected from the group consisting of anti-inflamatory agents, antimicrobial agents and mixtures thereof, and a carrier comprising non-volatile means for solubilizing said medicament, a volatile organic compound and an inert propellant, and having a relatively narrow elongated nozzle having a bore extending therethrough and having an exhaust end and an opposite end communicating with said container; and
   placing said exhaust end of said nozzle closely adjacent said skin areas; and
   actuating said actuating means such that the composition in said container is carried by said nozzle to said skin areas in atomized form, whereby said medicament is concentrated in said non-volatile solubilizing means thereby facilitating absorption of the medicament by said skin areas and substantial wetting of the hair extending outwardly of said skin areas is avoided.

2. The method of claim 1 wherein said volatile organic compound is ethanol.

3. The method of claim 1 wherein said anti-inflamatory agent is a steroid.

4. The method of claim 1 wherein said solubilizing means is an ester derived from a lower alkyl alcohol and a fatty acid.

5. The method of claim 4 wherein said alcohol is isopropyl alcohol.

6. The method of claim 5 wherein said fatty acid is myristic acid.

7. A method of delivery of medicaments to the human scalp normally having substantial amounts of hair thereon which comprises:
   providing a pressurized aerosol spray container having a push-button actuating means and containing a composition comprising an effective amount of a steroid, a minor amount of isopropyl myristate, and a major amount of ethanol and an inert propellant and having a relatively narrow elongated nozzle member having an exhaust end and an opposite end communicating with said container, said nozzle member having a bore diameter between about 0.01 and about 0.06 inches; and
   placing said exhaust end of said nozzle closely adjacent said scalp, and
   actuating said push-button actuating means such that the composition in said container is carried by said nozzle to said skin area in atomized form whereby said steroid is concentrated in said isopropyl myristate thereby facilitating absorption of the medicament by the scalp and substantial wetting of the hair normally extending outwardly of said scalp is avoided.

8. The method of claim 7 wherein an effective amount of the steroid is about 0.5 percent by weight of the composition less the propellant.

9. The method of claim 7 wherein a minor amount of isopropyl myristate is about 5 percent by weight of the composition less the propellant.

10. The method of claim 7 wherein said nozzle has a length of about 5 inches and an outer diameter of about ⅛ inch.

* * * * *